No. 719,882. PATENTED FEB. 3, 1903.
J. SCALES.
METHOD OF SUBDIVIDING BLOCKS OR INGOTS OF CARBID.
APPLICATION FILED MAY 6, 1902.
NO MODEL.

Witnesses:
R. A. Balderson.
William E. Neff.

Inventor:
Joseph Scales,
by Byrnes & Townsend,
Attys.

UNITED STATES PATENT OFFICE.

JOSEPH SCALES, OF NIAGARA FALLS, NEW YORK, ASSIGNOR TO UNION CARBIDE COMPANY, A CORPORATION OF VIRGINIA.

METHOD OF SUBDIVIDING BLOCKS OR INGOTS OF CARBID.

SPECIFICATION forming part of Letters Patent No. 719,882, dated February 3, 1903.

Application filed May 6, 1902. Serial No. 106,217. (No model.)

*To all whom it may concern:*

Be it known that I, JOSEPH SCALES, a citizen of the United States, residing at Niagara Falls, in the county of Niagara and State of New York, have invented certain new and useful Improvements in Methods of Subdividing Blocks or Ingots of Carbid, of which the following is a specification.

This invention relates to a method for the subdivision of blocks or ingots of those carbids which react with water, and particularly to a method for detaching large pieces of calcium carbid from the blocks or ingots formed in carbid-furnaces.

In electric furnaces of the type shown in United States Patent No. 597,880, issued January 25, 1898, to William Smith Horry, the formation of the carbid is continuous and the product is obtained in the furnace as a block or ingot of great size and weight. In order to remove the carbid from the furnace it is necessary that it be subdivided. This is accomplished according to my invention in the following manner: One or more holes are drilled or bored into the body of the block or ingot while it is still in a highly-heated state, and at the same time water or steam is injected into the cavity, preferably through the drill, and into contact with the carbid. The cutting-surface of the drill is thereby preserved, and the drilling or boring operation is facilitated by the local disintegration of the carbid due to the reaction therewith of the injected water or steam. A wedge may then be driven into the hole or holes made by the drill and a section of the desired size thereby broken off from the main block, the line of fracture passing through the drill-hole.

The invention will be readily understood by reference to the accompanying drawings, in which—

Figure 1:
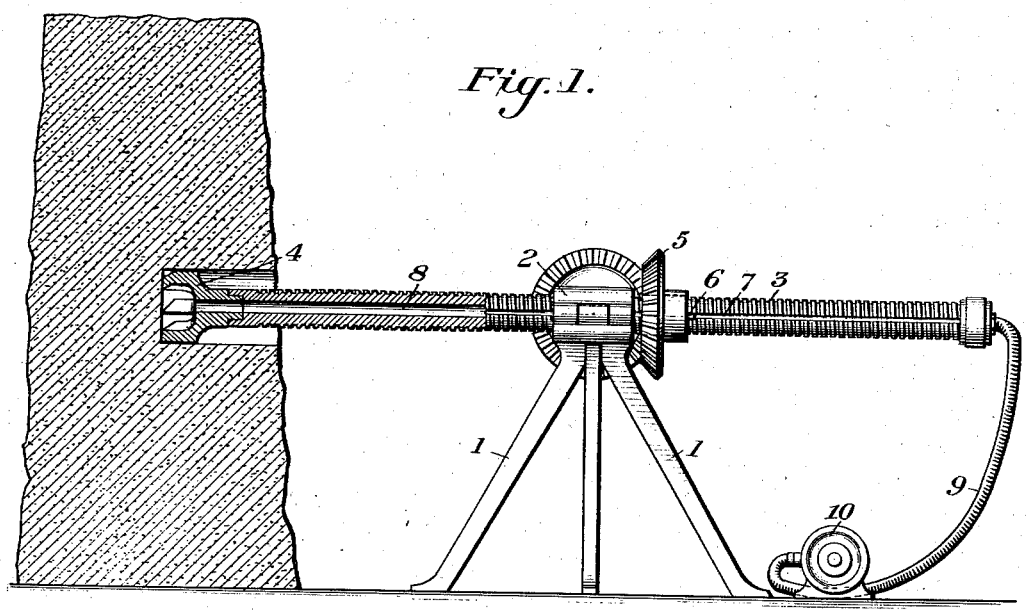
Figure 2:
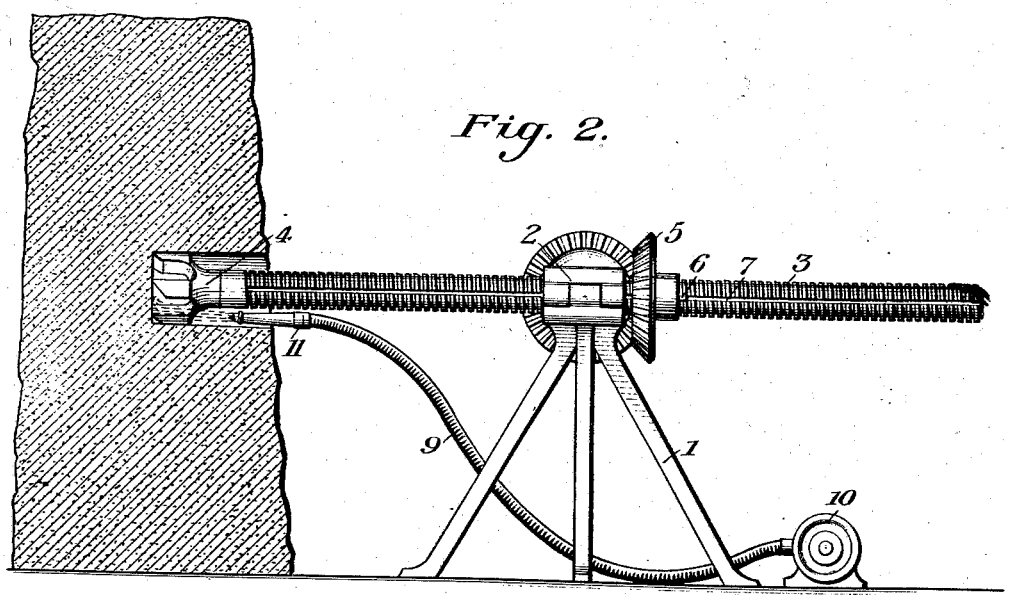

Figure 1 is a side elevation showing the block of carbid and a portion of the drill in vertical section, water being supplied through the hollow drill; and Fig. 2 is a side elevation with the block of carbid in vertical section, showing water injected into the bore-hole at one side of the drill.

The drill employed may be of any well-known or suitable construction. That shown in Figs. 1 and 2 comprises a standard 1, having at its upper end a head 2, within which is a horizontally-threaded passage. Through the head 2 passes a threaded shaft 3, which constitutes the stem of the drill and carries at its forward end a cutting-bit 4. The drill is simultaneously rotated and driven forward by a bevel-gear 5, journaled loosely on the threaded shaft 3, but having a spline 6, which engages a longitudinal groove 7 in the shaft. The stem 3 of the drill shown in Fig. 1 has a central passage 8, to and through which water is delivered by a flexible hose 9, leading from a pump 10. In the construction shown in Fig. 2 water is delivered into the bore-hole at one side of the drill by a nozzle 11, fed by hose 9 and pump 10. While the drill shown is one using a rotary or boring bit, a drill with a reciprocating bit may be employed or any mechanical device which will produce a recess or hole in the block to be subdivided.

Although the operation is best accomplished by the coincident use, as above described, of a drill and injected steam or water, it may be effected by a jet of steam or water alone without the use of the drill or other mechanical appliance. In this case the local disintegration above referred to is relied upon to form a cavity or opening into which a wedge may be driven.

I claim—

1. The method of subdividing blocks or ingots of those carbids which react with water, which consists in drilling the block, simultaneously injecting water or steam into the cavity formed by the drill, and then breaking the block through said cavity.

2. The method of subdividing heated blocks or ingots of those carbids which react with water, which consists in drilling the block, simultaneously injecting water or steam into the cavity formed by the drill, and then breaking the block through said cavity.

3. The method of subdividing blocks or ingots of those carbids which react with water, which consists in drilling the block, simultaneously injecting water or steam into the cavity through the drill, and then breaking the block through said cavity.

4. The method of discharging carbid from electric furnaces, which consists in drilling a block or ingot of carbid while still retained within the furnace, simultaneously injecting steam or water into the cavity formed by the drill, and then breaking the block through said cavity.

5. The method of discharging carbid from electric furnaces, which consists in drilling a block or ingot of carbid while still retained within the furnace, simultaneously injecting steam or water into the cavity through the drill, and then breaking the block through said cavity.

6. The method of subdividing blocks or ingots of those carbids which react with water, which consists in subjecting said blocks or ingots to the action of a jet of steam or water to form a cavity therein, and then breaking the block through said cavity.

7. The method of subdividing blocks or ingots of materials which react with water, which consists in drilling the block, simultaneously injecting water or steam into the cavity formed by the drill, and then breaking the block through said cavity.

8. The method of subdividing blocks or ingots of materials which react with water, which consists in subjecting a block or ingot to the action of a jet of steam or water to form a cavity therein, and then breaking the block through said cavity.

In testimony whereof I affix my signature in presence of two witnesses.

JOSEPH SCALES.

Witnesses:
GEO. H. DANFORTH,
E. F. PRICE.